United States Patent
Zendle et al.

(10) Patent No.: US 6,628,627 B1
(45) Date of Patent: Sep. 30, 2003

(54) WIRELESS SYSTEM FOR PROVIDING SYMMETRICAL, BIDIRECTIONAL BROADBAND TELECOMMUNICATIONS AND MULTIMEDIA SERVICES EMPLOYING A COMPUTER-CONTROLLED RADIO SYSTEM

(75) Inventors: Allan M. Zendle, Oakton, VA (US); David Ackerman, Washington, DC (US)

(73) Assignee: Winstar Communications Inc., New York, NY (US)

(*) Notice: Subject to any disclaimer, the term of this patent is extended or adjusted under 35 U.S.C. 154(b) by 0 days.

(21) Appl. No.: 09/112,504

(22) Filed: Jul. 9, 1998

Related U.S. Application Data
(60) Provisional application No. 60/052,057, filed on Jul. 9, 1997.

(51) Int. Cl.[7] ................................. H04B 7/00
(52) U.S. Cl. .............................. 370/310; 370/395
(58) Field of Search ................ 370/321, 334, 370/336, 347, 395, 396, 409, 442, 458, 485, 498, 310, 310.2, 312, 326, 328, 432

(56) References Cited

U.S. PATENT DOCUMENTS

| | | |
|---|---|---|
| 4,144,496 A | 3/1979 | Cunningham et al. |
| 4,352,202 A | 9/1992 | Carney |
| 5,260,673 A | 11/1993 | Pham |
| 5,394,559 A | 2/1995 | Hemmie et al. ............ 455/5.1 |
| 5,412,660 A | 5/1995 | Chen et al. ............ 370/110.1 |
| 5,437,052 A | 7/1995 | Hemmie et al. ............ 455/5.1 |
| 5,544,036 A | 8/1996 | Brown, Jr. et al. |
| 5,546,428 A | 8/1996 | Nam et al. |
| 5,577,056 A | 11/1996 | Malik et al. |
| 5,592,491 A | 1/1997 | Dinkins .................. 370/277 |
| 5,610,941 A | 3/1997 | Tanaka et al. ............ 375/222 |
| 5,719,872 A | 2/1998 | Dubberly et al. |
| 5,745,837 A | 4/1998 | Fuhrmann |
| 5,771,449 A | 6/1998 | Blasing et al. |
| 5,809,253 A | 9/1998 | Gallagher et al. |
| 5,920,626 A | * 7/1999 | Durden et al. .................. 380/10 |
| 6,016,311 A | * 1/2000 | Gilbert et al. .............. 370/280 |
| 6,016,313 A | 1/2000 | Foster, Jr., et al. |
| 6,070,001 A | * 5/2000 | Meissner et al. ....... 395/200.33 |
| 6,081,518 A | 6/2000 | Bowman-Amuah |

FOREIGN PATENT DOCUMENTS

| | | |
|---|---|---|
| DE | 28 43 493 B2 | 4/1980 |
| DE | 39 19 530 C2 | 12/1990 |
| EP | 0 388 381 A1 | 9/1990 |
| EP | 0 584 872 A1 | 3/1994 |

(List continued on next page.)

OTHER PUBLICATIONS

D. Raychaudhuri et al., "WATMnet: A Prototype Wireless ATM System For Multimedia Personal Communication", 1996 IEEE, pp. 469–477.

*Primary Examiner*—Wellington Chin
*Assistant Examiner*—Brenda Pham
(74) *Attorney, Agent, or Firm*—Ohlandt, Greeley, Ruggiero & Perle, L.L.P.

(57) ABSTRACT

A multi-service subscriber radio unit includes an antenna and a transceiver which is operatively coupled to the antenna. The radio unit further includes a modem which is coupled to the transceiver and a packet control unit. The packet control unit provides multi-service packetized data for transmission (up-link) to the modem and receives multi-service packetized data from the modem (down-link). The packet control unit extracts service specific packetized data from the received multi-service packetized data and also generates the transmit multi-service packetized data from a plurality of service specific data from customer premise equipment. A plurality of service interface units are included which provide a suitable electrical interface between the customer premise equipment and the radio unit. A distribution control unit is interposed between the packet control unit and the plurality of service interface units. The distribution control unit directs service specific data to and from the service interface units.

14 Claims, 5 Drawing Sheets

FOREIGN PATENT DOCUMENTS

| | | |
|---|---|---|
| EP | 0713347 | 5/1996 |
| EP | 0 719 062 A2 | 6/1996 |
| EP | 0 755 164 A2 | 1/1997 |
| GB | 2 260 671 A | 4/1993 |
| GB | 2 276 798 A | 10/1994 |
| WO | WO 94/03004 | 3/1994 |
| WO | WO 94/15431 * | 7/1994 |
| WO | WO 95/25409 | 9/1995 |
| WO | 9625806 | 8/1996 |
| WO | WO 96/25806 | 8/1996 |
| WO | 9721285 | 6/1997 |

* cited by examiner

WIRELESS SYSTEM FOR PROVIDING SYMMETRICAL, BIDIRECTIONAL BROADBAND TELECOMMUNICATIONS AND MULTIMEDIA SERVICES EMPLOYING A COMPUTER-CONTROLLED RADIO SYSTEM

This application claims the benefit of U.S. Provisional application, Ser. No. 60/052,057 entitled "A WIRELESS SYSTEM FOR PROVIDING SYMMETRICAL, BIDIRECTIONAL BROADBAND TELECOMMUNICATIONS AND MULTIMEDIA SERVICES EMPLOYING A PERSONAL COMPUTER-BASED RADIO CARD" which was filed on Jul. 9, 1997.

BACKGROUND

1. Technical Field

The present disclosure relates generally to wireless communications systems and more particularly relates to a wireless system utilizing millimeter microwave radio frequencies to provide symmetrical, bidirectional broadband telecommunication and multimedia services to remote terminals which distribute the services about the remote terminal location.

2. Description of Related Art

There is an ever-increasing demand for higher bandwidth, multi-service telecommunications to both commercial facilities and residential homes. This demand is driven by the advent of telecommuting, pay-per-view television programming, video-on-demand, and Internet commerce. Services such as these have varied data-types (e.g. voice, broadband multimedia, and video) with widely varying traffic patterns, "Quality of Service (QoS)" constraints and bandwidth requirements. As the need for higher bandwidth and more varied services effects a greater number of homes, telecommunication service providers will be tasked with providing the residential home consumer with common access to these services in a fast, cost-effective and easy-to-maintain way.

Fixed wireless technology is gaining popularity as means for transmission of telecommunication services because of its low cost, rapid installation and ease of operation. Connecting two sites with wireless service may largely consist of installing roof top antennas on the top of the sites and connecting the antennas to the accompanying indoor equipment. Physical wires do not have to be connected between the sites, representing a significant advantage over copper or fiber technology. Because deployment of broadband fixed wireless systems does not require civil construction in most instances, it is thus faster and more economical to install than traditional methods of "last mile" interconnection of offices and homes to a telecommunications network.

Another reason for the growing interest in millimeter microwave radio technology is performance. When broadband wireless links are engineered properly, the links provide a high-bandwidth path for voice, narrow band data, broadband multimedia content and video whose resulting performance can be functionally equivalent to fiber optics. In addition, current technology permits link distances up to five miles.

Providing traditional telecommunication (i.e., telephony) services to residential homes across wireless systems is well known. However, supplying wireless services such as broadband multimedia and video to customers' homes has more recently begun to emerge and develop. For instance, Multipoint Distribution Systems (MDS) and, more recently, Multi-channel Multi-point Distribution Systems (MMDS) provide wireless television service to households having MDS or MMDS compatible equipment. The initial so-called "wireless cable" systems operated within the MDS frequency range of 2150 MHZ to 2162 MHZ. Limited television programming over one or two channels was provided under the MDS frequencies. With the advent of MMDS, operating in a frequency range of 2500 MHZ to 2686 MHZ, a plurality of channels may be simultaneously provided to a microwave antenna located on the rooftop of a customer's home.

Emerging simultaneously with the development of television programming systems, as described above, has been the need to provide feedback from the customer to the program delivery source such as, for example, pay per view systems. Initially, with respect to wireless cable systems, no such return link existed and the customer was left to rely on making a phone call to the programming source in order to communicate his programming choices. Television set top units were later manufactured which provided standard telephone hookups for sending data back to the programming provider's billing computer. However, connecting a telephone line to every set top unit is costly.

Instructional Television Fixed Service (ITFS) response frequencies (2686.0625 MHZ to 2689.8125 MHZ) have been considered for use as return link frequencies by the FCC. However, due to the fact that the receive (MMDS) and transmit (ITFS) frequencies are so close to one another, separate receive and transmit antennas were initially required to implement such an approach. This increased the cost and complexity of such a solution.

A system for providing a forward wireless programming path as well as a return over-the-air information/data path which attempts to overcome the above problem is proposed in U.S. Pat. Nos. 5,394,559 and 5,437,052 (both issued to Hemmie et al.). The Hemmie et al. systems provide bidirectional over-the-air transfer of programming and information/data between a common transmission point such as a tower and each of a plurality of remote locations such as consumers' houses. This is accomplished by utilizing the same microwave antenna at a consumer's house for receipt of programming and for transmission of data. A bidirectional converter and dual polarity isolated feed system is utilized to receive and to "down convert" the MMDS microwave programming signals and to "up convert" and transmit the ITFS response microwave data signals.

However, while such a system provides a bidirectional transfer path, it is to be appreciated that both the forward transmission path and, more severely, the return transmission path, are limited in their service-providing capacity and the system architecture fails to provide compatibility with services other than those which are television programming related.

In the art, point-to-point narrow band, point-to-multi-point narrow band and point-to-point broadband fixed wireless systems are generally known. Point-to-multi-point radio technology is also a known technology that has been generally used for narrow band communications, such as voice. Narrow band systems are typically systems that are capable of generating at or below 1.544 megabits per second of data in a single circuit or channel, whereas broadband systems are capable of generating data rates above 1.544 megabits per seconds per circuit or channel. While narrow band point-to-multi-point systems have been used for voice communications, point-to-multi-point systems have not been generally applied to broadband telecommunications networks.

One example of a typical wireless point-to-point broadband commercial application is the interconnection of multiple servers in a campus local area network (LAN). Another such application is metropolitan wide area networking. In this case, multiple campus LANs within the same city are interconnected via wireless facilities. Dedicated access to inter-exchange carriers (IXCs), Internet Service Providers (ISPs) and other alternate access arrangements are common point-to-point business applications for wireless links. In the millimeter microwave radio range, cellular and personal communication services (PCS) operators may deploy high availability wireless facilities in their backbone networks to support back haul between antenna sites, base stations and mobile telephone switching offices (MTSO's). Wireless point-to-point technology is also used to provide mission critical protection channels and other point-to-point alternate routing where extension is required from a fiber network to a location that is not served by fiber. Finally, interconnection with the public switched telephone network (PSTN) for the provision of local dial tone by competitive local exchange carriers (CLECs) utilizing point-to-point wireless technology is becoming increasingly popular.

Referring to FIG. 1, a basic spectrum management problem associated with the use of prior art point-to-point wireless systems in a metropolitan area is shown. Because buildings are close to each other in a metropolitan area, the broadcast of information over wireless links may overlap, making the use of the same channel (1A/1B) in contiguous systems impossible. In FIG. 1, one antenna from one building is transmitting its signal to the antenna of the intended receiver, but a portion of the signal is also being received by the antenna on the adjacent building. Such signal corruption is termed "co-channel interference."

In FIG. 1, a host building 101 containing a switch 102 is connected via four rooftop antennas 103A, 103B, 103C and 103D respectively to remote buildings 104A, 104B, 104C and 104D, each with its own corresponding rooftop antenna. Shown between these buildings is a conceptual representation of the spectrum being utilized by each of these point-to-point wireless systems. As buildings get close together, transmission signals between buildings begin to overlap. To prevent co-channel interference, different channels must be used to connect buildings that are in close proximity. For instance, channel 1A/1B is used for building 104D and channel 2A/2B is used for building 104C. Even though channel 1A/1B partially overlaps the transmission of 2A/2B, the use of different frequencies (channels) by the two systems provides protection from co-channel interference. Thus the antenna of one building may be transmitting a portion of its signal to the wrong receiving antenna, but each system is "tuned" to a different frequency and transmission from neighboring systems using other frequencies is ignored.

The frequency management technique shown in FIG. 1 avoids co-channel interference in wireless networks deployed in dense urban areas, however the use of FCC channels to avoid co-channel interference does not maximize the information transport capacity of the licensed spectrum and is therefore inefficient. A solution to this problem is needed.

FIG. 2 illustrates an additional prior art spectrum management problem associated with point-to-point systems. Building 201 connects to building 202 through channel 1. Building 203 connects to building 204 through channel 2. The solid connection lines 205,206 represent the wireless transmission that is intended. However, because the "transmit beam" is about 2 degrees at the source, signals can be received by other systems that are not the intended recipient but happen to be in the range of the transmit beam of the originating system. The dotted line 207 represents such a case, where the system in building 204 unintentionally receives the transmission of the system in building 201. If two distinct frequencies were used, there would be minimal co-channel interference. Once again, frequency management in point-to-point wireless networks requires the use of multiple channels to avoid interference rather than allowing the spectrum to be used to drive incremental bandwidth.

Antenna tower space is expensive and in many cases there are restrictions on the number, size and position of antennas deployed on a tower. Because point-to-point systems use separate antennas for each wireless connection, space quickly becomes a limiting factor on hub buildings or hub towers. As the number of point-to-point systems located on a building increases, not only do spectrum management considerations limit the number of systems which can be deployed, but the physical space available for each antenna on the hub buildings or hub tower also constrains the number of systems. Thus, a solution is required which permits the expansion of wireless network capacity, and thus the number of users, without a corresponding increase in the number of antennas.

Point-to-point systems provide users with what is called a full period connection. Full period connections are "always on" (connected and active), awaiting the transport of information. Full period wireless connections utilize dedicated spectrum, which, once assigned, is unavailable to other users. Point-to-point wireless systems are therefore appropriate for applications involving continuous or lengthy transmissions. Point-to-point systems do not efficiently support variable bit rate or "bursty" data services where the requirement for bandwidth is not constant but rather variable. Bandwidth utilized by point-to-point systems for variable bit rate applications is wasted, as each system utilizes the allocated channel on a full time "always on" basis regardless of the amount of information or the duration of transmissions on the link. A solution is required to more efficiently utilize spectrum for "bursty" data services like LAN to LAN data transmission.

It would therefore be advantageous to provide a wireless system utilizing millimeter microwave radio frequencies to provide symmetrical, bidirectional broadband telecommunication and multimedia services between a hub radio and remote terminal. To enable such a system, a cost-effective remote terminal is required to transfer data with the hub radio and distribute multi-service broadband telecommunication and multimedia services at the remote terminal location.

SUMMARY

It therefore is an object to provide a wireless system utilizing millimeter microwave radio frequencies to provide symmetrical, bidirectional broadband telecommunication and multimedia services to remote terminals.

It is another object to provide a millimeter microwave computer-controlled radio system at the remote terminal location.

It is yet another object to provide a millimeter microwave computer-controlled radio system at the remote terminal location taking the form of a circuit board installed in a personal computer which receives and transmits signals within the millimeter microwave frequency range and distributes the broadband telecommunication and multimedia services at the remote terminal location.

It is yet another object to provide a millimeter microwave computer-controlled radio system at the remote terminal location taking the form of a stand-alone system which receives and transmits signals within the millimeter microwave frequency range and distributes the broadband telecommunication and multimedia services at the remote terminal location.

It is yet another object to provide symmetrical, high bandwidth bidirectional telecommunication and multimedia services between a hub radio and remote terminals.

It is another object to provide a method of eliminating co-channel interference between remote subscribers utilizing the same hub radio.

It is another object to increase the effective range of customer facilities using a broadband wireless link.

It is another object to provide multiple access or point to multipont access between a hub radio and a plurality of remote terminals.

It is still another object to form a linkage between the single radio hub and a remote customer terminal.

In accordance with one form of the present system a multi-service subscriber radio unit includes an antenna and a transceiver which is operatively coupled to the antenna. The radio unit further includes a modem which is interposed between the transceiver and a packet control unit. The packet control unit provides multi-service packetized data for transmission (up-link) to the modem and receives multi-service packetized data from the modem (down-link). The packet control unit extracts service specific packetized data from the received multi-service packetized data and also generates the transmit multi-service packetized data from a plurality of service specific data from customer premise equipment. A plurality of service interface units are included which provide a suitable electrical interface between the customer premise equipment and the radio unit. A distribution control unit is interposed between the packet control unit and the plurality of service interface units. The distribution control unit directs service specific data to and from the service interface units.

Preferably, the packetized data takes the form of Asynchronous Transfer Mode protocol data. In a further preferred embodiment, the plurality of service interface units include at least one of an Internet service interface, a television set top box interface, and a telephony interface.

The transceiver, modem, packet control unit, distribution control unit and plurality of service interface units can be as an integrated printed circuit board for insertion into a standard computer interface slot. Alternatively, a dedicated controller can be included and the transceiver, modem, packet control unit, distribution control unit, plurality of service interface units and dedicated controller can be formed as a stand-alone unit. In yet another alternate embodiment, the antenna and transceiver are integrated as an outdoor unit and the modem, packet control unit, distribution control unit and plurality of service interface units are integrated as an indoor unit. The indoor unit can be formed as a standard computer card or as a stand alone unit with a dedicated controller. In either case, the outdoor unit and indoor unit are coupled by a high bandwidth conduit, which may be wireless, copper or fiber.

In the above embodiments, it is preferable that the transceiver supports a multiple access protocol. One such protocol is time division multiplexing.

In another embodiment, a communications system is formed which provides access between remote customer premise equipment and service providers. The system includes a hub site which is coupled to a plurality of service providers and exchanges packetized service data therewith. The hub site merges the packetized service data into multi-service data which is provided to a hub radio for establishing bidirectional multi-service wireless data communications in a coverage sector. The system also includes a remote subscriber unit. The remote subscriber unit includes a subscriber radio for exchanging multi-service data with the hub radio. The remote subscriber unit extracts a plurality of service specific signals from the multi service data and directs the service specific signals to a plurality of customer premise equipment. The remote subscriber unit also receives a plurality of service specific signals from the customer premise equipment and transmits a multi-service signal to the hub radio, whereby bidirectional multi-service communication is provided.

These and other objects, features and advantages will become apparent from the following detailed description of illustrative embodiments thereof, which is to be read in connection with the accompanying drawings.

DETAILED DESCRIPTION OF PREFERRED EMBODIMENTS

Figure 1:
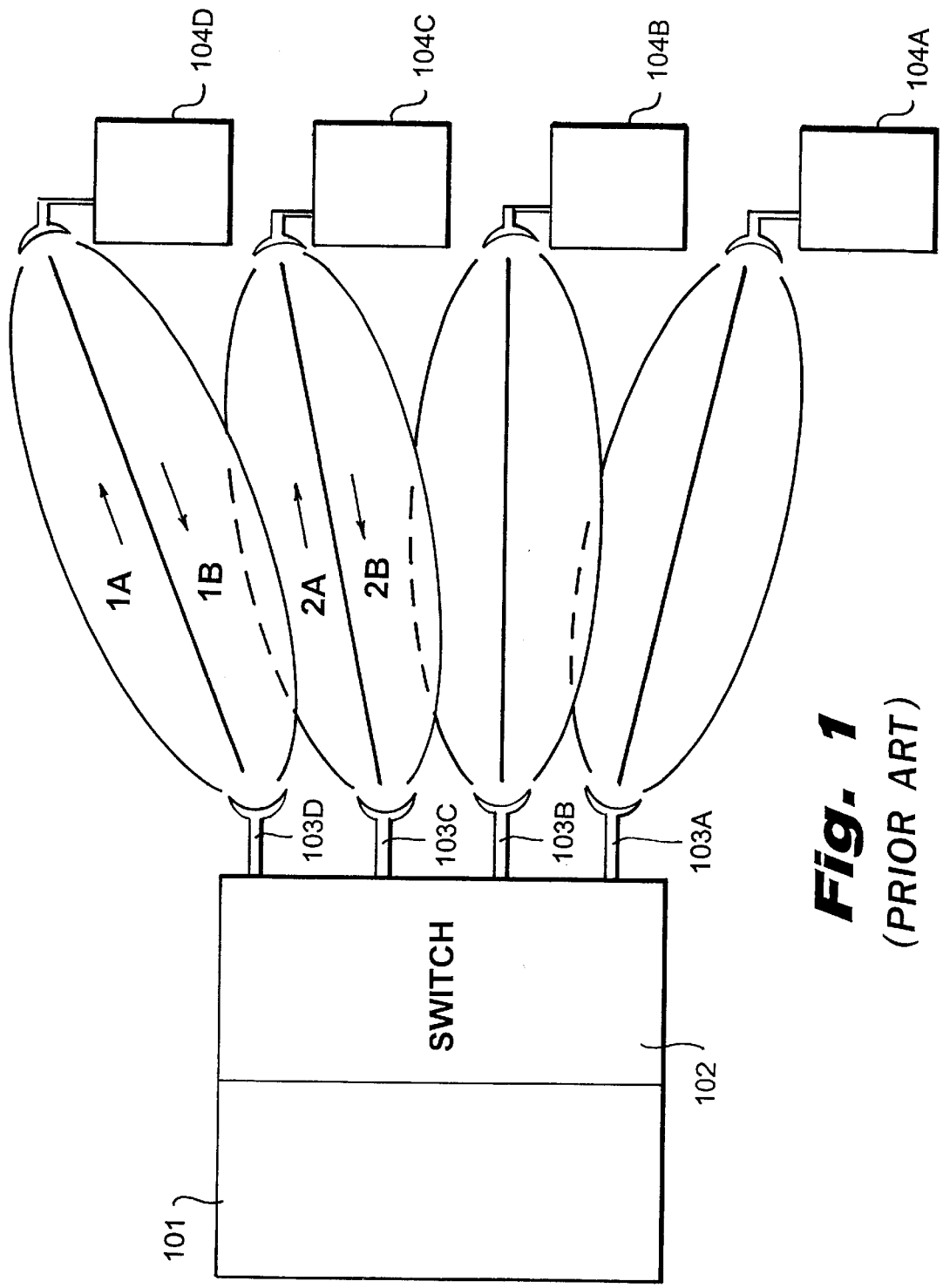
FIG. 1 is a pictorial diagram illustrating a point-to-point fixed wireless system of the prior art in which there is a one to one relationship between a hub radio and a customer building. Areas of overlap illustrate a co-channel interference phenomenon encountered in point-to-point fixed wireless networks.
Figure 2:
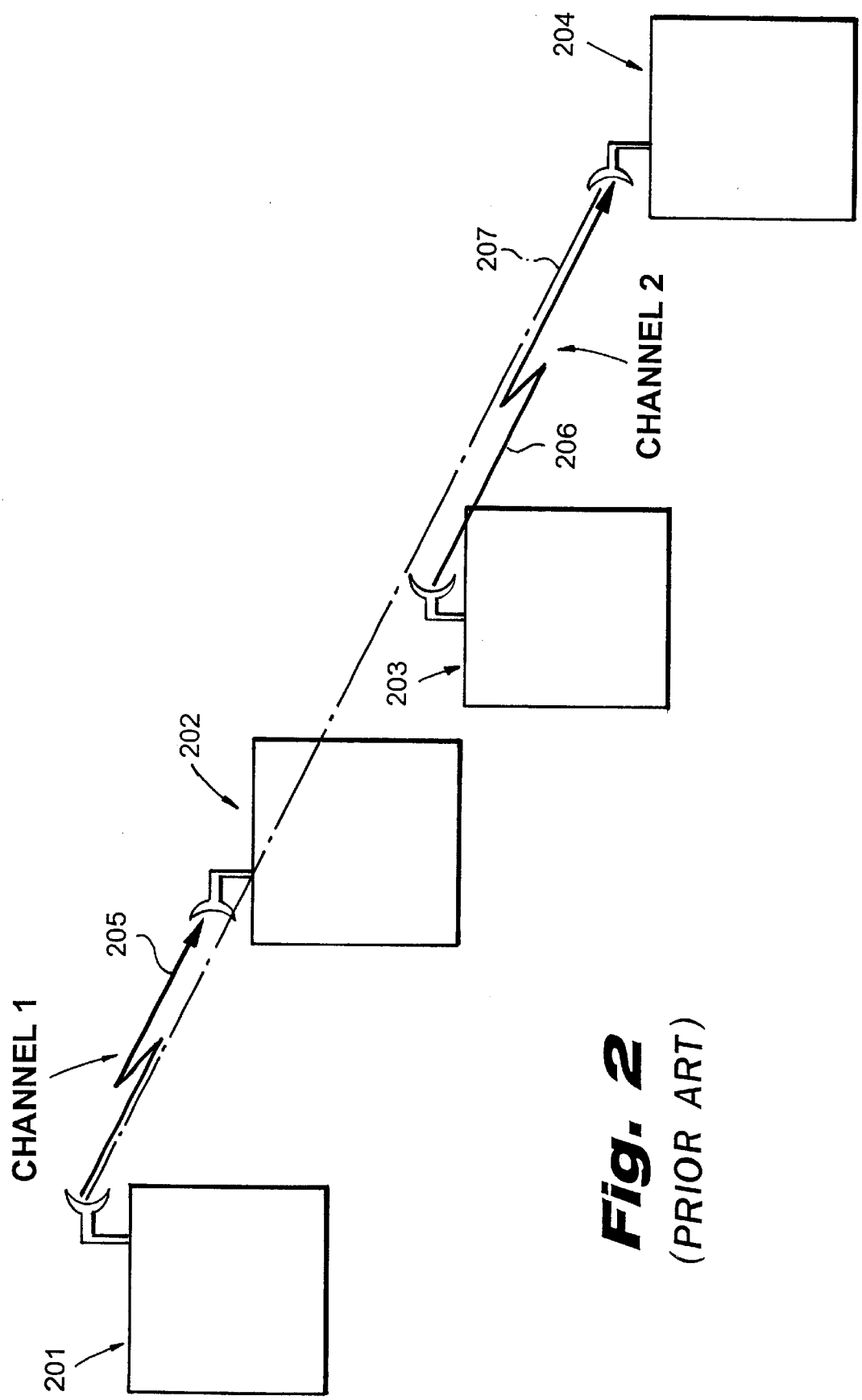
FIG. 2 is a diagram which illustrates another co-channel interference phenomenon encountered in point-to-point fixed wireless systems of the prior art.
Figure 3:
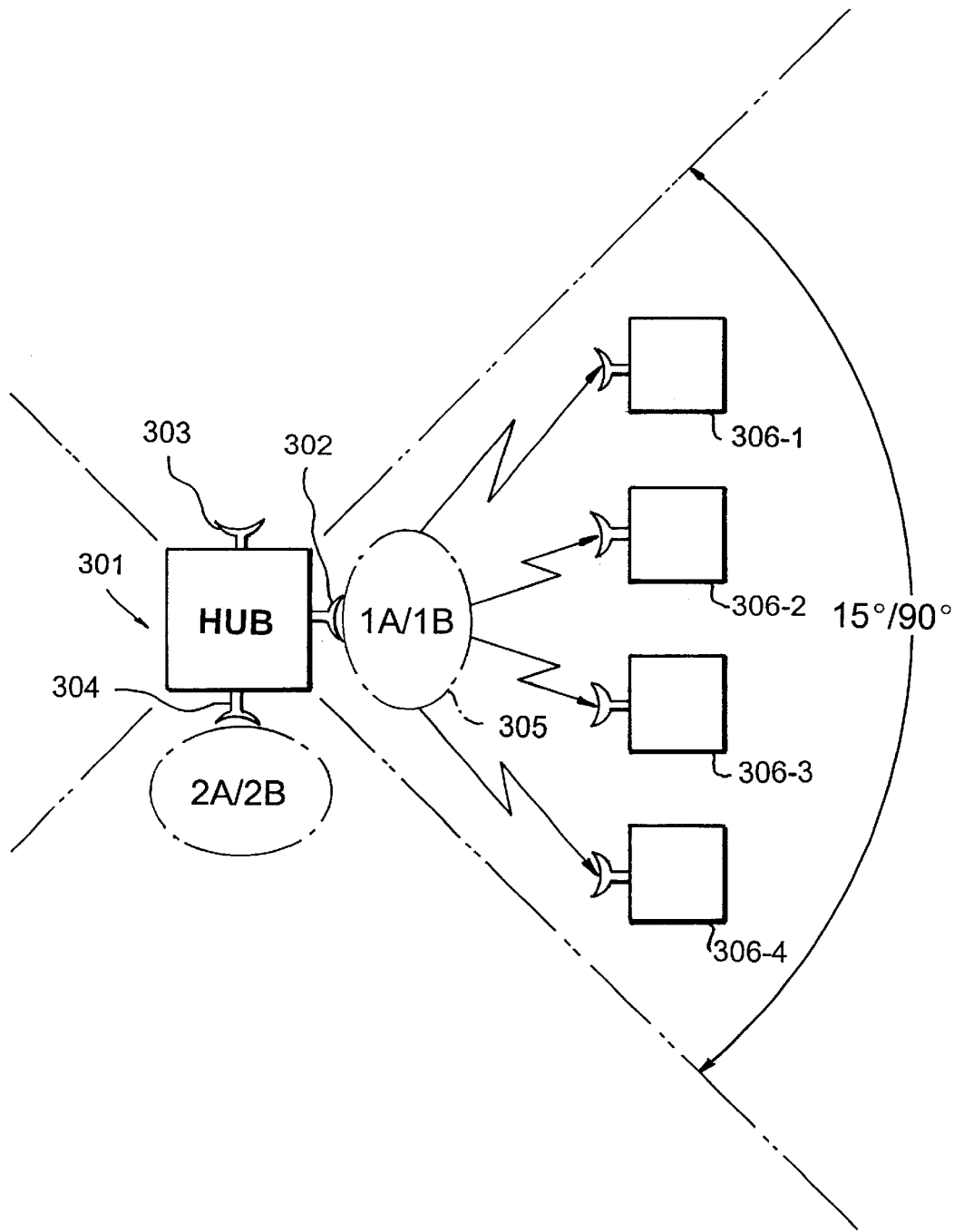
FIG. 3 is a diagram illustrating a fixed wireless point-to-multi-point implementation in which there exists a one-to-many relationship between a hub radio and customer systems within a sector employed in the present system.

FIG. 3 illustrates a bidirectional broadband wireless multi-service system which includes at least one hub site 301 and a plurality of remote multi-service subscriber terminals 306-1, 306-2, 306-3, and 306-4, residing in a coverage area of the hub site 301. The hub site 301 is preferably linked in a network to other hub radios 301 and service provider nodes via high bandwidth links such as wireless or fiber optic links. Each hub site 301 provides a plurality of remote residential customer terminals (subscribers) with a variety of telecommunication, data and multimedia services. The hub site 301 preferably includes one or more antennas 302, 303, and 304 to provide sectorized antenna beams to communicate with remote multi-service subscribers 306. The sector widths can be varied from about 15 to about 90 degrees wide, depending on subscriber density, desired operating range and required bandwidth.

The remote multi-service subscriber terminals 306 residing in a sector utilize a single channel for communication with the hub site 301 (unless additional bandwidth is required), so co-channel interference is no longer an issue for buildings within the same sector. When additional bandwidth is required, one or more additional channels can be added within a sector by the hub site 301. In this case, it is preferable for the remote multi-service subscriber terminals 306 to be frequency agile, such that each terminal is dynamically controlled to communicate on a channel within the sector to provide optimal bandwidth allocation. Alternatively, the remote customer terminals within a sector can be fixed frequency devices which are set to one of the channels within the sector where that terminal resides.

To prevent co-channel interference at the edges of sectors, the hub site 301 assigns. frequencies to adjacent sectors which are substantially separated from each other. For example, sector 302 may be assigned channel 1A/1B and sector 304 then assigned channel 2A/2B. Thus point to multi point systems permit full utilization of each channel assigned within a sector to transport information, in contrast to the spectrum management requirements of.point-to-point systems which require the utilization of multiple channels in the same geographical area merely to avoid co-channel interference.

Multiple hub sites 301 can be interconnected with fiber or via wireless links and equipped with multiplex equipment to bridge two or more point-to-point links to the same or different customer terminals on different hubs. In this manner, networking is employed to significantly increase the effective range of customer facilities and enable inter-sector communication among subscribers.

The present system utilizes millimeter microwave radio as a vehicle to incorporate a multiple access scheme to allow a many-to-one relationship between the remote multi-service subscriber terminals 306 and the hub sites 301. This technology, termed "multiple access" or "point-to-multipoint", supports traditional voice and data telephony services as well as commercial and residential broadband multimedia services by combining improvement in spectrum efficiency and available bandwidth with enhanced intelligence in a wide area network.

The point-to-multipoint hub sites are generally interconnected by a backbone network, preferably a fiber optic network such as a SONET (Synchronous Optical Network) ring, or a microwave radio network joining each hub. The backbone network may preferably be a SONET based infrastructure utilizing a packet based protocol, such as ATM (Asynchronous Transfer Mode), to switch and route customer traffic to destination points within the network. ATM is a packetized transmission technology which organizes information into cells. The ATM data cells have a "header" and a "payload". The header describes what kind of data is in the payload and where the data is to terminate. The cells propagate through the network via diverse paths and can arrive out of sequence at the hub site 301. Header information contained in the cells permits reconstruction of the correct cell sequence by the multi-service subscriber terminals 306 prior to delivery to the customer premise equipment.

ATM cells can transport many standard telecommunications voice, data and video services by encapsulating the data in the payload. Thus, ATM is capable of integrating voice, data and video in a single telecommunications transport network. Key to the unique nature of this network architecture is the integration of point-to-multipoint spectrum management with an ATM based transport layer. The hub site 301 receives ATM cells from a plurality of services which are directed to a remote subscriber terminal 306. The hub site merges the data from these services into a multi service ATM data stream which is transmitted in the sector where the appropriate remote multi-service subscriber terminal 306 resides.

Point-to-multipoint radio at millimeter wave frequencies can support any and all services supportable by wire-line technologies. These services include two broadly defined categories: traditional telecommunications and emerging broadband multimedia services.

Traditional telecommunications services for the commercial market include voice grade local and long distance services, point-to-point dedicated facilities at DS-1, n×DS-1 and DS-3 speeds for voice and data, switched data services such as switched 56 Kb/s and Frame Relay, and high capacity point-to-point data facilities operating at OC-3 speeds and above. Commercial customers such as businesses, office buildings, and office campuses that are connected via millimeter wave wireless links to wide area networks also have access to a host of emerging broadband multimedia services. These include high speed Internet access, web hosting and information services, native LAN-LAN services such as Ethernet and Token Ring, and video services such as desktop video conferencing, business related commercial video programming, and on-demand video training. Wireless customer access links to the network are provisioned at virtually any data rate.

Residential customers that are connected to the network have services available which include a subset of the above for telecommuting and Small Office/Home Office (SOHO) applications. For the non-business customer, a package of services including local and long distance telephony, high speed Internet access and information services, and selectable video programming is available.

The Remote Customer Terminal Unit

Figure 4:
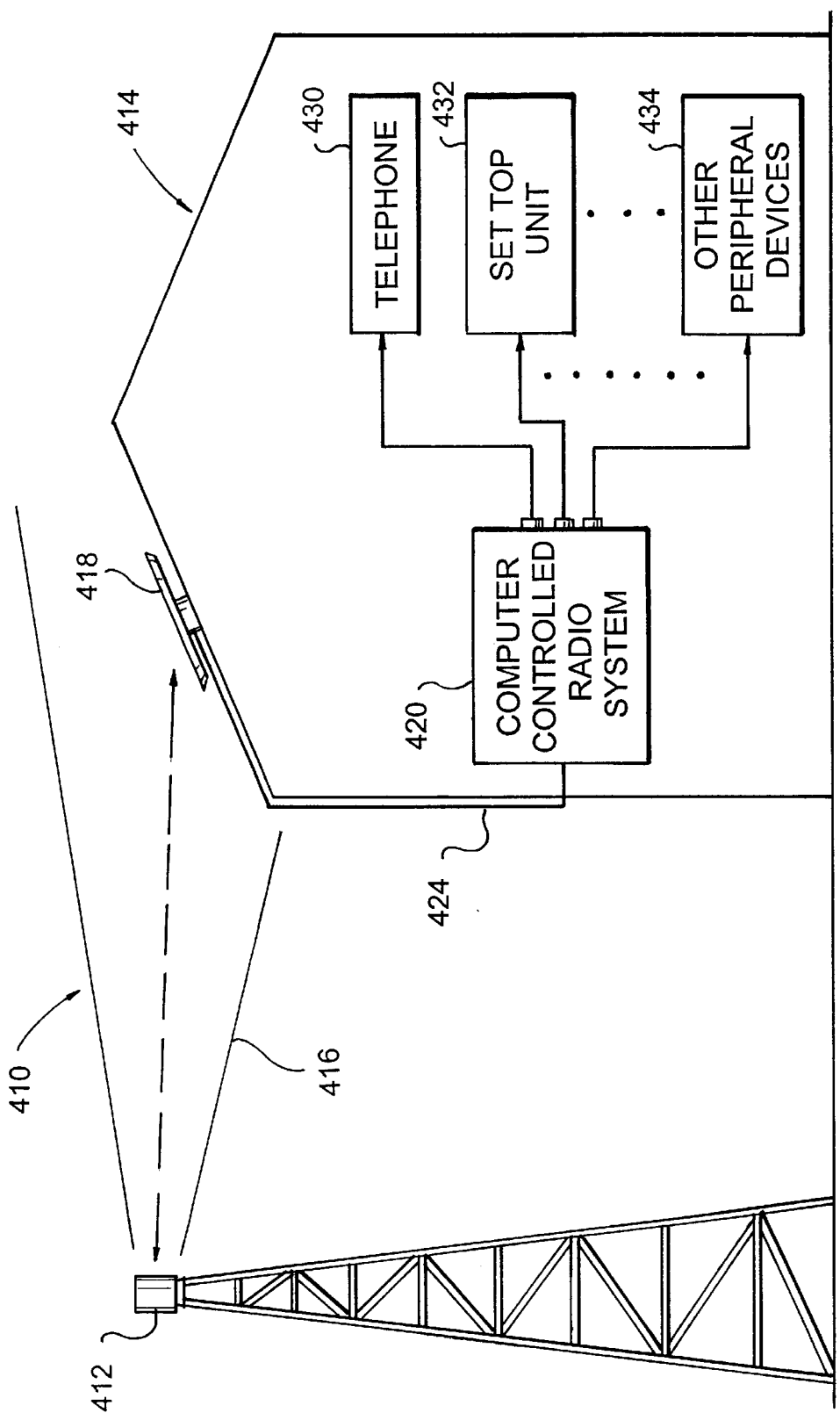
FIG. 4 is a block diagram illustrating an embodiment of the present bidirectional broadband wireless multi-service system employing a computer-based radio card.

A bidirectional broadband wireless multi-service system 410 employing a computer-based multi-service radio system is shown in FIG. 4, which illustrates an exemplary link between a hub site 412 (comparable to site 301 in FIG. 3) and a multi-service subscriber terminal 414 (comparable to terminal 306 in FIG. 3) within a sector of the hub site. The multi-service subscriber terminal 414 is equipped with a computer-controlled radio system 420 which includes a millimeter microwave radio connected to a computer within the remote subscriber terminal 414. The remote subscriber terminal in a residential environment is generally a customer's house. The computer can be a personal computer or a special purpose computer embodied within a standalone enclosure. The radio card is operatively coupled to an antenna 418, preferably mounted on the roof of the customer's house, which provides for both receiving signals from the hub radio and transmitting signals back to the hub radio, via link 424, such as a coaxial cable.

The multi-service subscriber terminal also includes means for distributing the traditional telecommunications and multimedia services to both internal and external control devices/units (e.g., telephone equipment 430, television set top unit 432, and other peripheral devices 434 such as application software running on the computer, etc.). The computer-based radio card is controlled by software running on the computer which permits the customer to utilize and/or interface with the specific services. Particularly, the computer-based radio system 420 receives the transmitted microwave signal from the hub radio 412, demodulates the signal and then distributes the appropriate service signals demodulated from the transmitted signal to the appropriate control devices/units. For instance, assuming that the transmission signal contains signals associated with traditional telephony services, Internet services and video services, the computer-based radio card receives and demodulates the multi-service signal into individual service signals and then respectively distributes them to the appropriate control devices/units, e.g., telephony service to the telephone, video service to a set top unit, while Internet services may remain internal to the computer. In a similar manner, the radio system may then modulate customer generated data, information and responses for transmission back to the hub radio 412 and onto the backbone network to the appropriate service provider. It is to be appreciated that, while only one remote terminal is shown in FIG. 4, there may be a plurality of similar remote terminals within the system. Further, while a residential remote terminal is illustrated, a similar internal architecture (i.e., antenna, cabling, computer-based radio card, control devices/units), may be employed in a commercial business office environment.

Figure 5:
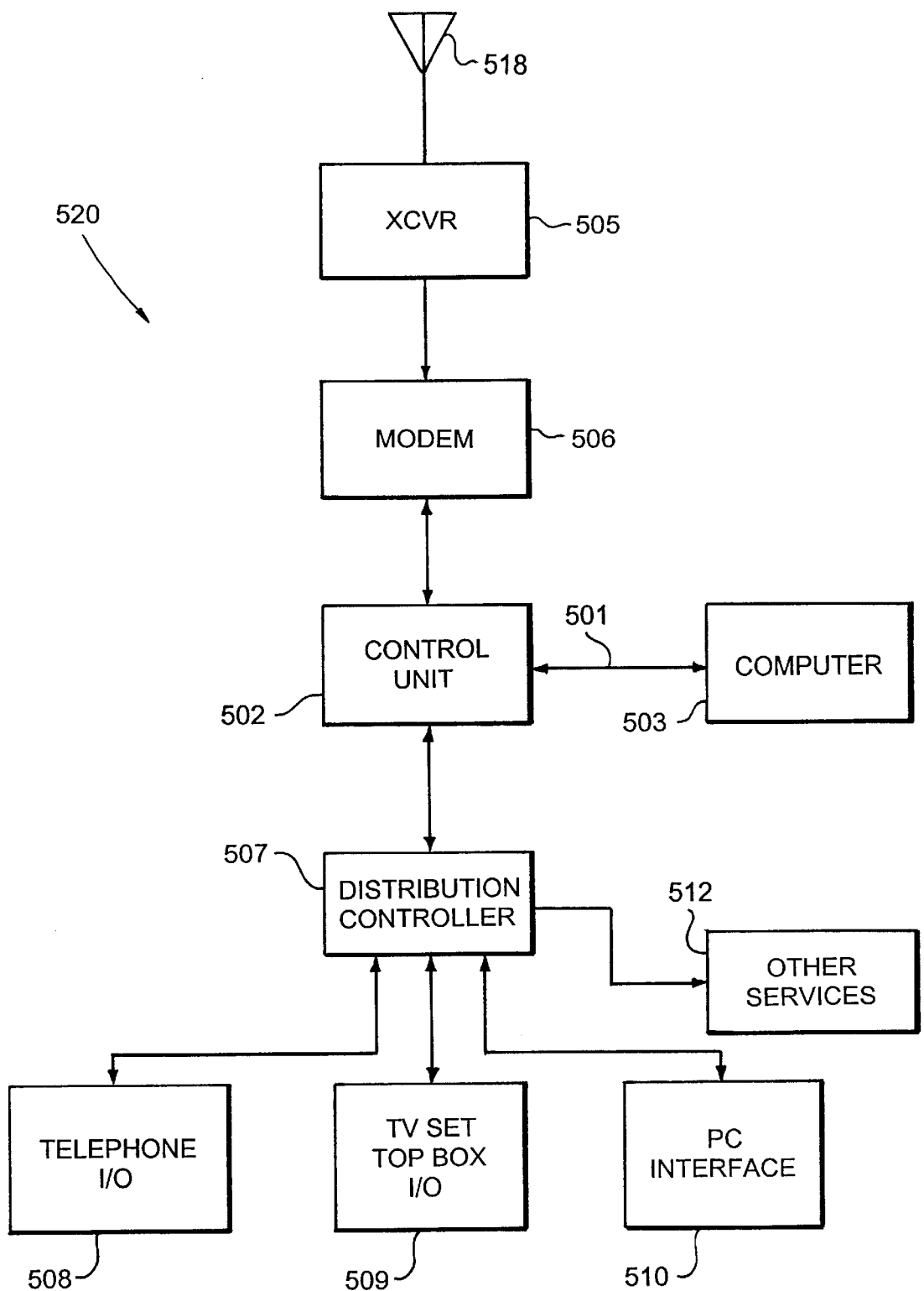
FIG. 5 is a block diagram of a computer-controlled radio system used at remote subscriber locations.

FIG. 5 illustrates a block diagram of the computer-controlled multi-service radio system 520 having several functional sections for performing system functions. The radio system 520 includes a transceiver section 505 for receiving and transmitting millimeter microwave signals from and to the antenna 518, respectively. Such a transceiver section 505 preferably includes a frequency synthesizer section to provide frequency agility to facilitate dynamic channel assignments. The transceiver section 505 converts received millimeter microwave signals to modulated baseband signals which represent the multi-service ATM packetized data from the hub site. Similarly, for signal transmission, the transceiver section 505 receives a modulation signal having ATM packetized data encoded therein from the customer premise equipment and transmits this modulation signal on a millimeter microwave carrier. The transceiver section preferably supports high order modulation such as quadrature amplitude modulation (QAM), 16 QAM and the like. Further, the transceiver section preferably includes a controller (not shown) for implementing signal multiplexing, such as time division multiple access protocols which are required to provide multiple subscriber access to the hub site.

The radio system 520 further includes a modem section 506 which is operatively coupled to the transceiver section 505. The modem section 506 receives the modulated baseband signals from the transceiver 505 and demodulates the received signals. The modem section 506 also receives ATM packetized data originating from customer premise equipment and generates the modulation signal for the transceiver 505.

A control unit 502 is coupled to the modem section 506 and provides the ATM packetized data for up-link transmission and receives the down-link ATM packetized data from the hub radio. The control unit operates as an ATM interface which merges data from multiple customer premise equipment within a remote location into a single ATM data stream for transport to the hub radio. The control unit 502 also receives a multi-service ATM data stream from the modem section 506 and directs the packets in the data stream to appropriate customer premise equipment based upon the packet header information.

To facilitate data distribution, the control unit 502 passes the data to a distribution controller 507 which reassembles the data packets from the control unit 502 into an ordered data stream for each service. The distribution controller 507 is operatively coupled to a plurality of service interfaces which convert the ATM data streams into an appropriate signal for the selected services. Such interfaces include a telephony interface 508, a cable/television set top box interface 509, and other service interfaces 510 such as home security reporting, a computer-based LAN for further signal distribution, and the like. These interfaces permit the customer to utilize and/or interface with the particular services provided by the system.

The control unit 502 is further operatively coupled to a computer interface 501 which provides a mechanism for a computer 503, which executes controlling software, to communicate with and control the radio system 520. The computer interface can take the form of a standard I/O interface like PCMCIA, ISA, EISA, or PCI in the case where the computer 503 is a personal computer. In the case where the computer 503 is a dedicated computer in a stand-alone enclosure, the computer interface 501 can take the form any of a number of standard I/O buses, or one designed specifically for this purpose to suitably interface a dedicated controller to the control unit 502.

In FIGS. 4 and 5, the transceiver 505 is illustrated in a location which is separated from the antenna 418, 518 and is coupled thereto via a microwave conduit such as coaxial cable 424. This arrangement allows the transceiver 505 to be integrated into the computer controlled radio system 520 and provides cost benefits related to integration, component selection and environmental concerns such as temperature and moisture exposure. However, the coaxial cable 424 has associated signal losses which may adversely effect system performance, especially at millimeter microwave frequencies. While this signal loss is tolerable in remote terminal locations proximate to the hub site, an alternate embodiment may be employed for remote terminal locations distal to the hub site. In an alternate embodiment, the transceiver 505 and antenna 518 are integrated into an outdoor unit which is mounted on an advantageous location at the customer premises. The outdoor unit is then coupled to the modem section 506 by an appropriate conduit, such as fiber or coax. As the signals being provided along the conduit are now at baseband frequencies (i.e., less than several hundred megahertz), the losses associated with the conduit are far less. Further, the cost of a suitable conduit at baseband frequencies is far less than at millimeter microwave frequencies.

An example of how the invention operates will now be explained. Referring back to FIG. 4, and with reference to FIG. 5, in accordance with the types of services to which the hub radio 412 is in communication across the backbone network, the hub radio 412 provides the data related to those services to the customer terminal 414 through the bidirectional broadband transmission path 416. Assuming services such as traditional telephony, Internet access and video programming are available, the hub radio 412 transmits a composite, multi-service signal to the customer terminal 414. The antenna 418 receives the composite signal whereby the signal is provided to the transceiver section of the radio system 420. The modem section receives the composite signal from the transceiver section and then demodulates the composite signal into individual service signals, i.e, telephone signals, Internet signals, video signals. These signals are respectively distributed by the distribution section of the radio system 420 to the appropriate customer premise devices/units, thus permitting the customer two-way access to the services.

For instance, if one of the services includes customer-selectable video programming, the bidirectional link permits the customer to make his programming selections and then receive the selected video through a set top unit 432. Similarly, if Internet services are transmitted by the hub radio 412, the customer may utilize such services directly on the computer (i.e., through the use of application software running on the computer) in which the radio card 420 is installed. For the stand-alone embodiment, a suitable personal computer interface, such as Ethernet, RS-232 and the like, can be provided as one of the service interfaces 510. Telephone service is provided in a similar fashion. Other peripheral devices 434 can also be operatively coupled to the multi-service subscriber radio system 420 to provide other services to the customer.

While the present system has been described with respect to preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention, as defined by the appended claims.

What is claimed is:

1. A multi-service subscriber radio unit comprising:
   an antenna;
   a transceiver, said transceiver being operatively coupled to said antenna;
   a modem, said modem being operatively coupled to said transceiver;
   a packet control unit, said packet control unit providing up-link multi-service packetized data to said modem and receiving down-link multi-service packetized data from said modem, said packet control unit extracting service specific packetized data from said down-link multi-service packetized data and generating said up-link multi-service packetized data from a plurality of service specific data;
   a plurality of service interface units providing and receiving service specific packetized data; and
   a distribution control unit, said distribution control unit being operatively coupled to said packet control unit and said plurality of service interface units, said distribution control unit directing the service specific data to and from said service interface units.

2. A multi-service subscriber radio unit as defined by claim 1, wherein said packetized data takes the form of Asynchronous Transfer Mode protocol data.

3. A multi-service subscriber radio unit as defined by claim 1, wherein said plurality of service interface units include at least one of an Internet service interface, a television set top box interface, and a telephony interface.

4. A multi-service subscriber radio unit as defined by claim 1, wherein said transceiver, said modem, said packet control unit, said distribution control unit and said plurality of service interface units are formed as an integrated printed circuit board, said circuit board being formed for insertion into a standard computer interface slot.

5. A multi-service subscriber radio unit as defined by claim 1, wherein said antenna and said transceiver are integrated as an outdoor unit and said modem, said packet control unit, said distribution control unit and said plurality of service interface units are integrated as an indoor unit, said outdoor unit and said indoor unit being coupled by a high bandwidth conduit.

6. A multi-service subscriber radio unit as defined by claim 1, wherein said transceiver supports a multiple access protocol.

7. A multi-service subscriber radio unit as defined by claim 6, wherein said multiple access protocol is time division multiplexing.

8. A communications system providing access between customer premise equipment and service providers comprising:
   a hub site, said hub site being operatively coupled to a plurality of service providers and exchanging packetized service data therewith, said hub site merging said packetized service data into multi-service data, said hub site including a hub radio for establishing bidirectional multi-service wireless data communications in a coverage sector; and
   a remote subscriber terminal, said remote subscriber terminal including a subscriber radio for communicating with said hub radio, said remote subscriber terminal having means for receiving said multi-service data from said hub radio, means for extracting a plurality of service specific signals therefrom and means for directing said service specific signals to a plurality of customer premise equipment, said remote subscriber terminal also having means for receiving a plurality of service specific signals from said plurality of customer premise equipment and means for transmitting a multi-service signal to said hub radio, whereby bidirectional multi service communication is provided.

9. A circuit card for a personal computer providing multi-service radio communications, the circuit card comprising:
   a transceiver, said transceiver having a port for operatively coupling to an antenna;
   a modem, said modem being operatively coupled to said transceiver;
   a packet control unit, said packet control unit providing up-link multi-service packetized data to said modem and receiving down-link multi-service packetized data from said modem, said packet control unit extracting service specific packetized data from said down-link multi-service packetized data and generating said up-link multi-service packetized data from a plurality of service specific data, said packet control unit being operatively coupled to the personal computer for receiving control signals therefrom and providing data thereto;
   a plurality of service interface units providing and receiving service specific packetized data; and
   a distribution control unit, said distribution control unit being operatively coupled to said packet control unit and said plurality of service interface units, said distribution control unit directing the service specific data to and from said service interface units.

10. A multi-service subscriber radio unit as defined by claim 9, wherein said packetized data takes the form of Asynchronous Transfer Mode protocol data.

11. A multi-service subscriber radio unit as defined by claim 9, wherein said plurality of service interface units include at least one of an Internet service interface, a television set top box interface, and a telephony interface.

12. A multi-service subscriber radio unit comprising:
    an outdoor unit, said outdoor unit including:
       an antenna; and
       a transceiver, said transceiver being operatively coupled to said antenna; and
    an indoor unit, said indoor unit being operatively coupled to said outdoor unit, said indoor unit including:
       a modem, said modem being operatively coupled to said transceiver;
       a packet control unit, said packet control unit providing up-link multi-service packetized data to said modem and receiving down-link multi-service packetized data from said modem, said packet control unit extracting service specific packetized data from said down-link multi-service packetized data and generating said up-link multi-service packetized data from a plurality of service specific data;

a plurality of service interface units providing and receiving service specific packetized data; and a distribution control unit, said distribution control unit being operatively coupled to said packet control unit and said plurality of service interface units, said distribution control unit directing the service specific data to and from said service interface units.

13. A multi-service subscriber radio unit as defined by claim 12, wherein said packetized data takes the form of Asynchronous Transfer Mode protocol data.

14. A multi-service subscriber radio unit as defined by claim 12, wherein said plurality of service interface units include at least one of an Internet service interface, a television set top box interface, and a telephony interface.

* * * * *